United States Patent
Von Der Ahe et al.

(10) Patent No.: US 8,527,961 B2
(45) Date of Patent: Sep. 3, 2013

(54) EXPRESSION-LEVEL DEBUGGING WITHOUT FORMAT CHANGES

(75) Inventors: Peter Von Der Ahe, Mountain View, CA (US); Martin Entlicher, Prague (CZ); Roman Ondruska, Prague (CZ)

(73) Assignee: Oracle America, Inc., Redwood Shores, CA (US)

( * ) Notice: Subject to any disclaimer, the term of this patent is extended or adjusted under 35 U.S.C. 154(b) by 1555 days.

(21) Appl. No.: 11/940,271

(22) Filed: Nov. 14, 2007
(Under 37 CFR 1.47)

(65) Prior Publication Data
US 2009/0125888 A1    May 14, 2009

(51) Int. Cl.
*G06F 11/36* (2006.01)

(52) U.S. Cl.
USPC .......................................................... 717/129

(58) Field of Classification Search
USPC .......................................................... 717/129
See application file for complete search history.

(56) References Cited

U.S. PATENT DOCUMENTS

| | | | |
|---|---|---|---|
| 5,675,803 A | 10/1997 | Preisler et al. | |
| 6,042,614 A | 3/2000 | Davidson et al. | |
| 6,553,565 B2 | 4/2003 | Click, Jr. et al. | |
| 6,651,243 B1 * | 11/2003 | Berry et al. | 717/130 |
| 6,789,216 B2 | 9/2004 | Zagorski et al. | |
| 6,836,857 B2 | 12/2004 | Ten-Hove et al. | |
| 6,912,708 B2 | 6/2005 | Wallman et al. | |
| 7,174,536 B1 * | 2/2007 | Kothari et al. | 717/109 |
| 2001/0047510 A1 * | 11/2001 | Angel et al. | 717/4 |
| 2003/0056200 A1 * | 3/2003 | Li et al. | 717/128 |
| 2007/0250819 A1 * | 10/2007 | Fjeldstad et al. | 717/129 |
| 2008/0244547 A1 * | 10/2008 | Wintergerst et al. | 717/158 |

OTHER PUBLICATIONS

Lindholm, T. et al., "The Java Virtual Machine Specification", Second Edition, Sun Microsystems, Inc., 1999 (445 pages).

* cited by examiner

*Primary Examiner* — Li B Zhen
*Assistant Examiner* — Joanne Macasiano
(74) *Attorney, Agent, or Firm* — Osha Liang LLP

(57) ABSTRACT

A debugging tool pauses or stops the execution of a computer program midway through the evaluation of a single line of source code that contains multiple expressions. A debugging tool pauses or stops the execution of a computer program after evaluating and executing one or more expressions within a particular line of source code, but before evaluating and executing one or more other expressions within that same particular line of source code. Thus, programmers can use such a debugging tool to debug a computer program at a level of granularity that is finer than source code line-level. Programmers can use such a debugging tool to debug a computer program, using breakpoints and/or stepping, at an expression-level of granularity.

9 Claims, 2 Drawing Sheets

EXPRESSION-LEVEL DEBUGGING WITHOUT FORMAT CHANGES

BACKGROUND

Computer programmers often write computer programs in human-understandable source code that conforms to the syntax of some programming language. Modern programming languages in which source code might be written include JAVA and C++. Because computer programmers are fallible and because programming can sometimes be a complicated task, computer programmers sometimes introduce mistakes into their source code when writing a computer program. Sometimes these mistakes will cause the program to throw an error when executed. Under such circumstances, a mistake in the program might be easily detected and repaired. However, other mistakes might not cause the execution of the program to halt. For example, some kinds of mistakes will permit the computer program to continue to execute, but will cause the computer program to behave in a way that the computer programmer did not intend. These non-fatal errors can be more difficult to detect and repair.

In order to assist computer programmers in tracking down the errors that are causing a computer program to exhibit unintended behavior, debugging tools are often provided in a computer programming environment. Some debugging tools allow computer programmers to insert breakpoints at specified lines within source code. Such debugging tools simulate the execution of the program up until a line at which a breakpoint has been inserted, and then pause the execution of the program so that the programmer can examine the state of the computer (e.g., memory, output, etc.) at that breakpoint. Programmers can use such breakpoints to determine at which line of a computer program unintended behavior is beginning to occur.

Additionally, some debugging tools allow computer programmers to "step" through the execution of a computer program, line-by-line in the source code. After simulating the execution of a single line of source code, the debugging tool pauses the execution of the program as with the breakpoints discussed above. Upon the programmer's instruction to continue execution (e.g., by pressing a specified key), the debugging tool proceeds to execute the following line in the source code, and then pauses execution again. In this manner, the computer programmer can use the debugging tool to execute the computer program a source code line at a time. After the execution of each source code line, the computer programmer can take the time to examine the effects of the execution of that source code line on the computer's state. This helps the computer programmer to identify the particular source code lines that are causing a computer program to exhibit unintended behavior. When the computer programmer identifies a line that is causing the unintended effects, the computer programmer can then modify that line so that the computer program no longer exhibits the unintended behavior.

Although debugging tools such as those described above can be invaluable in assisting a computer programmer, such debugging tools have historically suffered from some significant limitations. As is discussed above, breakpoints and stepping have traditionally been implemented on a line-by-line basis. Typically, the smallest unit that a debugging tool can execute before pausing a computer program's execution is an entire line of source code. This limitation can be troublesome under circumstances in which a single line of source code contains multiple different expressions. When a source code line contains multiple different expressions, a computer programmer might have some difficulty identifying the particular one of those expressions that is contributing to the program's erratic behavior.

For example, a single line in the source code of a computer program might contain an expression such as "m(f( ) f( )." The evaluation of such an expression causes the method "m( )" to be invoked with the results of two separate invocations of the method "f( )" as arguments. Thus, before the invocation of method "m( )" can be completely evaluated, each of the invocations of method "f( )" needs to be evaluated. Each one of these three method invocations is a separate expression in its own right; "f( )" and "f( )" are "subexpressions" of the "m(f( ) f( )" expression. Each such expression has a separate set of inputs (e.g., arguments) and a separate set of outputs (e.g., return values).

Any one (or more) of these three method invocations could be leading to erratic results produced during the computer program's execution. Indeed, the programmer might deduce, using debugging tools, that at least one of these method invocations is the source of the erratic results. However, because all three of these method invocations are present within the same line of source code, the programmer might have a very difficult time determining which one (or more) of these method invocations is causing the erratic behavior. Using traditional debugging tools, the programmer has no way of pausing the program's execution after the first invocation of method "f( )" but before the second invocation of method "f( )," or after the second invocation of method "f( )" but before the invocation of method"m( )."

SUMMARY

Techniques described herein allow a debugging tool to pause or stop the execution of a computer program midway through the evaluation of a single line of source code that contains multiple expressions. Techniques described herein allow a debugging tool to pause or stop the execution of a computer program after evaluating and executing one or more expressions within a particular line of source code, but before evaluating and executing one or more other expressions within that same particular line of source code. Thus, programmers can use a debugging tool based on these techniques to debug a computer program at a level of granularity that is finer than source code line-level. Programmers can use a debugging tool based on these techniques to debug a computer program, using breakpoints and/or stepping, at an expression-level of granularity.

According to a technique described herein, a compiler analyzes source code files to enable expression-level stepping during debugging. The compiler may be separate from the debugging tool. According to a technique described herein, the compiler in one embodiment creates a detailed mapping between source code language expressions and JAVA byte codes. Such a detailed mapping enables expression-level stepping during debugging. Additionally, according to a technique described herein, the compiler creates this detailed mapping without adding any additional debugging—this is an optional change information to JAVA class files. Because the JAVA language fully specifies the order of method calls and argument evaluation, it is possible to precisely map byte codes to syntax trees. Additionally, according to a technique described herein, the detailed mapping allows JAVA class files to be debugged without recompiling JAVA source code.

DETAILED DESCRIPTION OF EMBODIMENT(S)

Overview

In at least one embodiment of the invention, a compiler analyzes source code files to enable expression-level stepping during debugging. The compiler may be separate from the debugging tool. In such an embodiment of the invention, the compiler creates a detailed mapping between source code language expressions and JAVA byte codes. Such a detailed mapping enables expression-level stepping (as opposed to the coarser line-level stepping) during debugging. In such an embodiment of the invention, the compiler creates this detailed mapping without adding any additional debug information to JAVA class files. Because the JAVA language fully specifies the order of method calls and argument evaluation, it is possible to precisely map byte codes to syntax trees. In such an embodiment of the invention, the detailed mapping allows JAVA class files to be debugged without recompiling JAVA source code.

Using at least one embodiment of the invention described herein, a debugging program enables a programmer to pause the execution of a program at a programmer-specified point that is mid-way through a line of source code. For example, a line of source code might contain multiple expressions, some of which might be embedded within other expressions. According to at least one embodiment of the invention, the debugging program executes one expression on the line and then pauses, waiting for user input before proceeding to execute any other expressions on that same line. In at least one embodiment of the invention, a "line" of source code is defined by the presence of certain delimiting characters in the source code. For example, in at least one embodiment of the invention, a "line" of source code is a portion of source code that ends with a semicolon character and follows another semicolon character (and perhaps a hard return character), regardless of how many visual lines that portion occupies on a display.

For example, using at least one embodiment of the invention, if a program contains an expression such as "m(f( ), f( ))," a programmer can pause the program's execution after the first invocation of method "f( )" but before the second invocation of method "f( )," or after the second invocation of method "f( )" but before the invocation of method "m( )."

Expression-Level Stepping

Figure 1:
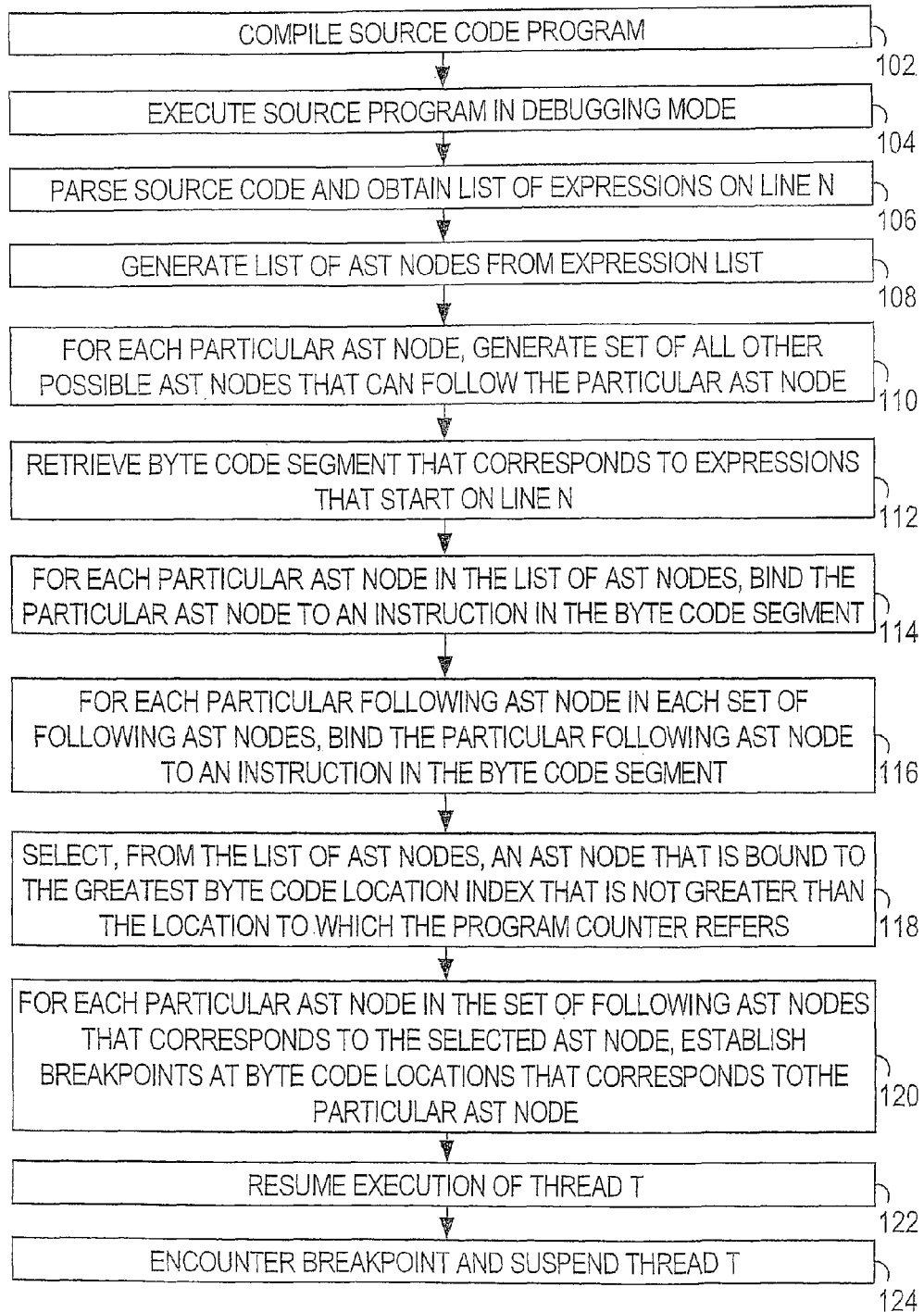
FIG. 1 is a flow diagram that illustrates a technique for enabling expression-level debugging, according to an embodiment of the invention.

FIG. 1 is a flow diagram that illustrates a technique for enabling expression-level debugging, according to an embodiment of the invention. The technique illustrated in FIG. 1 is merely one example of one embodiment of the invention. Other embodiments of the invention may include more, fewer, or different steps than those illustrated with reference to FIG. 1. The technique described below is described with reference to a JAVA source code program. However, alternative embodiments of the invention can be applied to programs written in programming languages other than JAVA.

In block 102, a compiler compiles a source code program (e.g., a JAVA program). As a part of compiling the source code program, the compiler generates and stores traditional line-number-based debugging information along with byte codes.

A debugging program can use such line-number-based debugging information to enable line-level breakpoints and line-level stepping. However, such line-number-based debugging information does not, by itself, enable a debugging program to provide breakpoint and stepping features at a level of granularity that is finer than an entire line of source code.

In block 104, a debugging program executes the source program in debugging mode. The source program may be multi-threaded. Regardless of whether the source program is multi-threaded or single-threaded, the debugging program suspends a particular thread of interest t on a particular line n of the source program. More specifically, the debugging program sets the current program counter to refer to a byte code location which corresponds to line n. The debugging program can determine this location based on a line number table that is present within the compiled byte code. The line number table is a product of the compilation that is performed in block 102. The byte code location to which the current program counter refers does not necessarily correspond to the first instruction on line n.

As used herein, the term "expression step" refers to the action of resuming the execution of thread t but then stopping the execution right before an invocation of the next existing method call in thread t. As used herein, the term "next method call" refers to a next method invocation instruction that is contained either in line n or on the line that follows line n in current execution order.

In block 106, the debugging program parses the source code file and obtains a list of expressions that start on line n. In at least one embodiment of the invention, the debugging program uses the "Javac" application programming interface to obtain an abstract source tree (AST) representation of these expressions.

In block 108, the debugging program generates a list of AST nodes from the list of expressions obtained in block 106. Each of the generated AST nodes represents either a method invocation or a new object creation.

In block 110, for each particular AST node in the list of AST nodes that was generated in block 108, the debugging program generates a corresponding set of all other possible AST nodes that can follow the particular AST node in execution order. In one embodiment of the invention, the execution order is specified by the rules of the JAVA programming language. Each such set represents all possible execution paths (e.g., conditional branches, loops, switch statements, etc.) that can be followed, during execution, from the expression that is represented by the particular AST node to which that set corresponds. As will be seen from the discussion below, the debugging program uses these "sets of following AST nodes" to determine, later, the next expression for the expression step.

In block 112, the debugging program retrieves a byte code segment that corresponds to expressions which start on line n. In at least one embodiment of the invention, the debugging program retrieves the appropriate byte code segment by referring to line number information that is present in the compiled byte code. The line number information is a product of the compilation that is performed in block 102. In such an embodiment of the invention, the debugging program retrieves the byte code segment that (a) starts at the byte code index that corresponds to the beginning of line n and (b) ends at the byte code index that corresponds to the next line that is available in the line number table of the byte code (or the very last byte code instruction, if there is no such line).

In block 114, for each particular AST node in the list of AST nodes that was generated in block 108, the debugging program binds that particular AST node to an appropriate instruction index (with opcodes between 182 and 185, inclusive) in the byte code segment that was retrieved in block 112. In one embodiment, in order to perform this AST node-to-instruction binding, the debugging program sequentially matches individual AST nodes with their corresponding instructions in the byte code segment. Each AST node has a corresponding instruction in the byte code segment. The order of the AST nodes in the list of AST nodes (generated in block 108) corresponds to the order of the byte code instructions in the byte code segment. Although an embodiment of the invention in which the opcodes include opcodes 182 through 185 is described above, in alternative embodiments of the invention, other opcodes may be used when dealing with other programming languages.

It is possible that the byte code segment might contain method calls that are not represented by any AST nodes in the list of AST nodes. For example, the byte code segment might contain synthetic methods and/or other helper methods that implement programming language constructs. In at least one embodiment of the invention, when the debugging program encounters a byte code instruction that represents a method call of this kind, the debugging program merely skips that byte code instruction in the byte code segment.

As a result of the operations of block 114, the debugging program generates a list of pairs, where each pair in the list includes an AST node and a byte code location that corresponds to that AST node. In one embodiment of the invention, these mappings between AST nodes and byte code locations are used to indicate the position of the program counter in an expression even in cases other than expression-level stepping. For example, the mappings can be used in this manner at any time when a debugged program is stopped by any means (e.g., by ordinary line-step going from the end of a method into the middle of an expression from which the method was called, or "step out," or just when pausing the program execution, or any other means that cause thread t to suspend execution). Although many conventional debuggers can display only the current line of code that is executing, debuggers according to certain embodiments of the invention can display, more precisely, a specific position at which execution is currently taking place within such a line (there may be multiple such positions in a single line) due to the mapping established as described above.

In block 116, for each particular set of following AST nodes that was generated in block 110, and for each particular following AST node that is in that particular set, the debugging program binds that particular following AST node to an appropriate instruction index (with opcodes between 182 and 185, inclusive) in the byte code segment that was retrieved in block 112. As a result of the operations of block 116, the debugging program generates a list of possible following byte code instructions for each "original" byte code instruction in the list of pairs that was generated as a result of the operations of block 114.

In block 118, the debugging program selects, from the list of AST nodes that was generated in block 108, the AST node that is bound to the greatest byte code location index that is also either less than or equal to the location to which the current program counter refers.

In block 120, for each particular following AST node in the set of following AST nodes that corresponds to the AST node that was selected in block 118, the debugging program submits or otherwise establishes a breakpoint (a point at which the debugging program will pause the execution of thread t) at the byte code location that corresponds to that particular following AST node. These breakpoints determine the boundary of the expression step. Regardless of which execution path thread t's execution follows, a breakpoint will be encountered in that path. One or more breakpoints may be established at different points in the same line n to which the program counter currently refers. For example, a breakpoint may be established in between two byte codes that represent two method calls on the same line n.

In block 122, the debugging program resumes execution of thread t (and possibly other application threads, as appropriate), which was previously suspended in block 104. This begins the actual performance of the expression step.

In block 124, while executing thread t, the debugging program encounters one of the breakpoints that was submitted or otherwise established in block 120. In response to encountering such a breakpoint, the debugging program again suspends execution of thread t. In at least one embodiment of the invention, the debugging program then removes all of the breakpoints that were established in block 120. In at least one embodiment of the invention, the debugging program notifies the programmer concerning information about the expression step that has just been performed. In at least one embodiment of the invention, the debugging program displays the new position of the program counter (which advanced when the debugging program resumed execution of the thread t in block 122). The new position of the program counter can be retrieved from the current operation, which has a reference to the appropriate AST node.

In at least one embodiment of the invention, control then passes back to block 106, at which the technique described above is performed again relative to a different location (but perhaps on the same line) in the source program.

Thus, expression-level stepping is enabled while debugging programs. The debugging program can pause or halt the execution of thread t after the execution of any byte code, regardless of the number of byte codes that collectively represent the method calls on a single line of source code. Expression-level stepping can help a programmer to identify, with greater precision, the source of erratic program behavior.

The JAVA Virtual Machine Specification, Second Edition, by Tim Lindholm and Frank Yellin, is incorporated by reference herein. The following patents are also incorporated by reference herein: U.S. Pat. No. 6,912,708, filed Jun. 28, 2001; U.S. Pat. No. 6,836,857, filed Oct. 18, 2001; U.S. Pat. No. 6,789,216, filed Sep. 27, 2002; U.S. Pat. No. 6,553,565, filed Apr. 23, 1999; U.S. Pat. No. 6,042,614, filed Jan. 9, 1998; and U.S. Pat. No. 5,675,803, filed Sep. 1, 1994.

Hardware Overview

Figure 2:
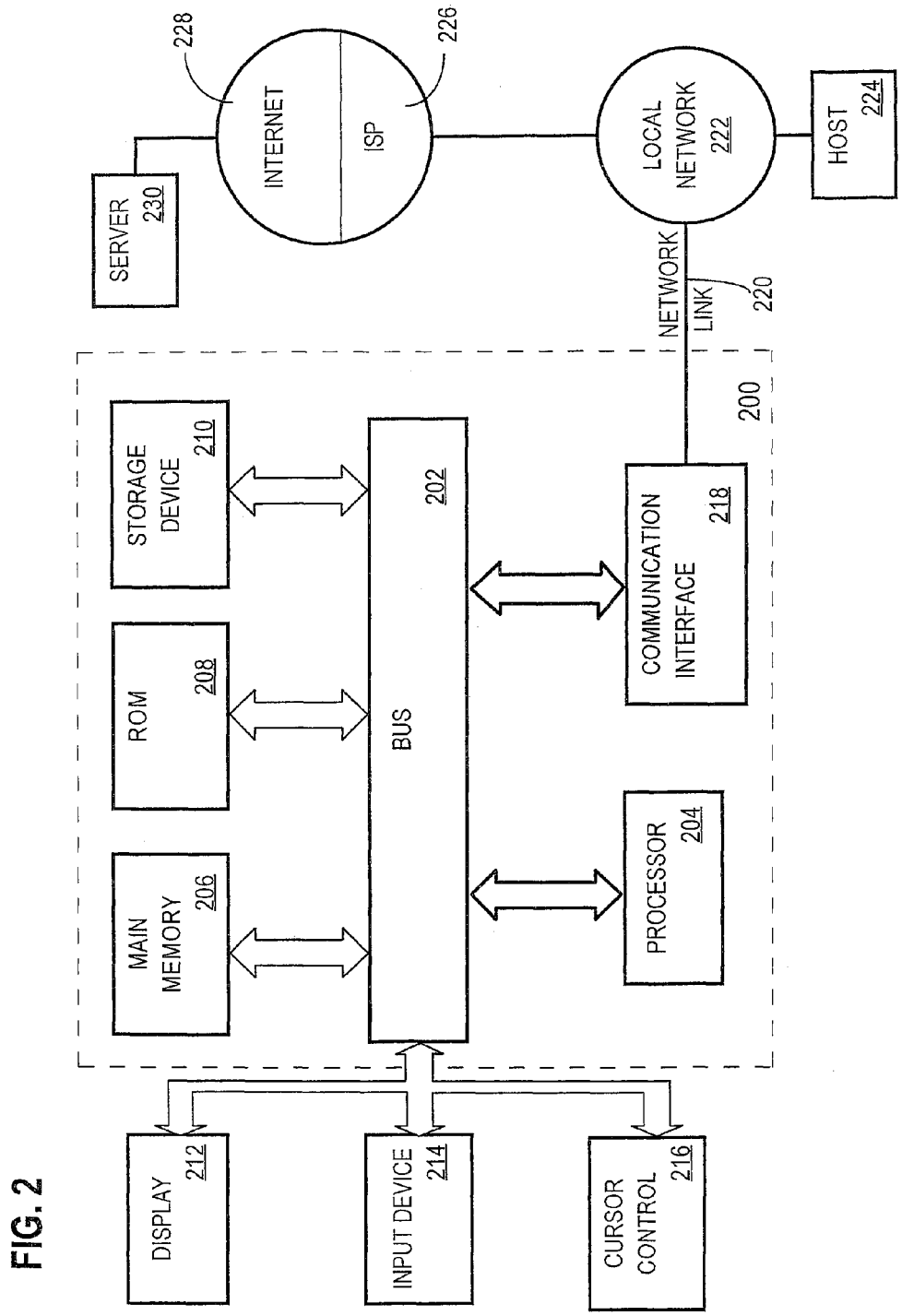
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium that carries wireless signals between one or more of the components. Bus 202 may also be a medium that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as an electromagnetic wave. Further, processor 204 may communicate with ROM 208 capacitively. In this instance, the bus 202 would be the medium that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

Processor 204 may execute the received code as the code is received and/or stored in storage device 210 or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for debugging a program, the method comprising:

establishing a first breakpoint at a first program location that is in a particular line of source code;

establishing a second breakpoint at a second program location that is in the same particular line of the source code but at a different program location than the first program location;

generating compiled byte code from the source code, wherein generating the compiled byte code comprises creating a line number table mapping byte code locations to line numbers of the source code;

executing, using the compiled byte code, a thread until the first breakpoint is encountered, and responsively suspending execution of the thread until user input is received, wherein executing the thread and responsively suspending execution comprises:

suspending execution of the thread on the particular line of the source code using the line number table;

obtaining a list of expressions that start on the particular line of the source code;

generating a list of abstract source tree (AST) nodes that correspond to expressions in the list of expressions;

for each particular AST node in the list of AST nodes, binding the particular AST node to a byte code instruction that matches the particular AST node, wherein the list of AST nodes is ordered according to an order of byte code instructions in a byte code segment corresponding to the particular line of source code;

for each particular AST node in the list of AST nodes, generating a corresponding set of other AST nodes that can follow the particular AST node in execution order;

for each particular set of other AST nodes generated, and for each particular following AST node in the particular set of other AST nodes, binding the particular following AST node to a byte code instruction that matches the particular following AST node;

selecting, from among the AST nodes in the list of AST nodes, a selected AST node that is bound to a greatest byte code location index that is also either less than or equal to the location to which the program counter refers; and for each following AST node in a set of following AST nodes that can follow the selected AST node in execution order, establishing a breakpoint at a byte code location that corresponds to that following AST node, wherein establishing a breakpoint at a byte code location that corresponds to that following AST node comprises establishing the first breakpoint; and in response to receiving user input, continuing to execute the thread until the second breakpoint is encountered, and responsively suspending execution of the thread.

2. The method of claim 1, wherein establishing the first breakpoint comprises establishing the first breakpoint after a first method invocation that is in the particular line of the source code, and wherein establishing the second breakpoint comprises establishing the second breakpoint after a second method invocation that is in the particular line of the source code.

3. The method of claim 2, wherein the first method invocation is nested within the second method invocation.

4. The method of claim 1, further comprising:

in response to encountering the first breakpoint during execution of the thread, displaying a new position of a program counter at the first breakpoint in the source code; and in response to encountering the second breakpoint during execution of the thread, displaying a new position of the program counter at the second breakpoint in the source code.

5. A non-transitory machine-readable medium carrying one or more sequences of instructions, which instructions, when executed by one or more processors, cause the one or more processors to carry out steps comprising:

establishing a first breakpoint at a first program location that is in a particular line of source code;

establishing a second breakpoint at a second program location that is in the same particular line of the source code but at a different program location than the first program location;

generating compiled byte code from the source code, wherein generating the compiled byte code comprises creating a line number table mapping byte code locations to line numbers of the source code;

executing, using the compiled byte code, a thread until the first breakpoint is encountered, and responsively suspending execution of the thread until user input is received, wherein executing the thread and responsively suspending execution comprises:

suspending execution of the thread on the particular line of the source code using the line number table;

obtaining a list of expressions that start on the particular line of the source code;

generating a list of abstract source tree (AST) nodes that correspond to expressions in the list of expressions;

for each particular AST node in the list of AST nodes, binding the particular AST node to a byte code instruction that matches the particular AST node, wherein the list of AST nodes is ordered according to an order of byte code instructions in a byte code segment corresponding to the particular line of source code;

for each particular AST node in the list of AST nodes, generating a corresponding set of other AST nodes that can follow the particular AST node in execution order;

for each particular set of other AST nodes generated, and for each particular following AST node in the particular set of other AST nodes, binding the particular following AST node to a byte code instruction that matches the particular following AST node;

selecting, from among the AST nodes in the list of AST nodes, a selected AST node that is bound to a greatest byte code location index that is also either less than or equal to the location to which the program counter refers; and for each following AST node in a set of following AST nodes that can follow the selected AST node in execution order, establishing a breakpoint at a byte code location that corresponds to that following AST node, wherein establishing a breakpoint at a byte code location that corresponds to that following AST node comprises establishing the first breakpoint; and in response to receiving user input, continuing to execute the thread until the second breakpoint is encountered, and responsively suspending execution of the thread.

6. The non-transitory machine-readable medium of claim 5, wherein establishing the first breakpoint comprises establishing the first breakpoint after a first method invocation that is in the particular line of the source code, and wherein establishing the second breakpoint comprises establishing the second breakpoint after a second method invocation that is in the particular line of the source code.

7. The non-transitory machine-readable medium of claim 6, wherein the first method invocation is nested within the second method invocation.

8. The non-transitory machine-readable medium of claim 5, wherein the steps further comprise:

in response to encountering the first breakpoint during execution of the thread, displaying a new position of a program counter at the first breakpoint in the source code; and in response to encountering the second breakpoint during execution of the thread, displaying a new position of the program counter at the second breakpoint in the source code.

9. A system comprising:
a compiler for compiling source code into byte code instructions;
a debugger for performing particular steps; and
a computer system on which the debugger executes;
wherein the particular steps comprise:
establishing a first breakpoint at a first byte code instruction of the byte code instructions, wherein the first byte code instruction corresponds to a first method invocation that is in a particular line of the source code;
establishing a second breakpoint at a second byte code instruction of the byte code instructions, wherein the second byte code instruction corresponds to a second method invocation that is in the same particular line of the source code but is separate from the first method invocation;

generating compiled byte code from the source code, wherein generating the compiled byte code comprises creating a line number table mapping byte code locations to line numbers of the source code;

executing, using the compiled byte code, a thread until the first breakpoint is encountered, and responsively suspending execution of the thread until user input is received, wherein executing the thread and responsively suspending execution comprises:

suspending execution of the thread on the particular line of the source code using the line number table;

obtaining a list of expressions that start on the particular line of the source code;

generating a list of abstract source tree (AST) nodes that correspond to expressions in the list of expressions;

for each particular AST node in the list of AST nodes, binding the particular AST node to a byte code instruction that matches the particular AST node, wherein the list of AST nodes is ordered according to an order of byte code instructions in a byte code segment corresponding to the particular line of source code;

for each particular AST node in the list of AST nodes, generating a corresponding set of other AST nodes that can follow the particular AST node in execution order;

for each particular set of other AST nodes generated, and for each particular following AST node in the particular set of other AST nodes, binding the particular following AST node to a byte code instruction that matches the particular following AST node;

selecting, from among the AST nodes in the list of AST nodes, a selected AST node that is bound to a greatest byte code location index that is also either less than or equal to the location to which the program counter refers; and for each following AST node in a set of following AST nodes that can follow the selected AST node in execution order, establishing a breakpoint at a byte code location that corresponds to that following AST node, wherein establishing a breakpoint at a byte code location that corresponds to that following AST node comprises establishing the first breakpoint; and in response to receiving user input, continuing to execute the thread until the second breakpoint is encountered, and responsively suspending execution of the thread.

* * * * *